Oct. 1, 1974   J. P. NAUTA   3,839,514
METHOD OF EMBOSSING THERMOPLASTIC SHEET USING A ROLL
HAVING A SURFACE OF VARY HARDNESS
Original Filed Aug. 20, 1970   3 Sheets-Sheet 1

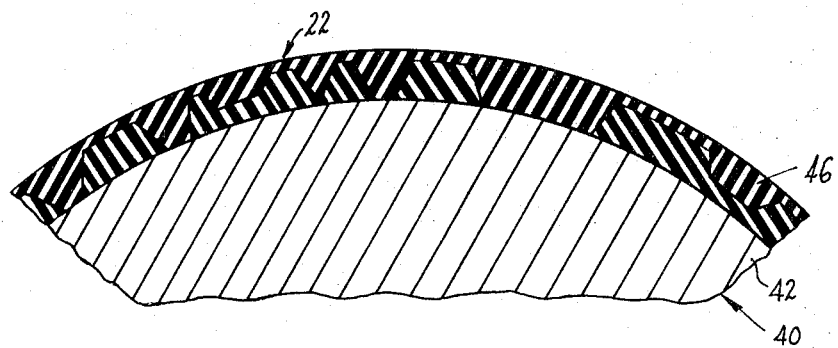
FIG. 5
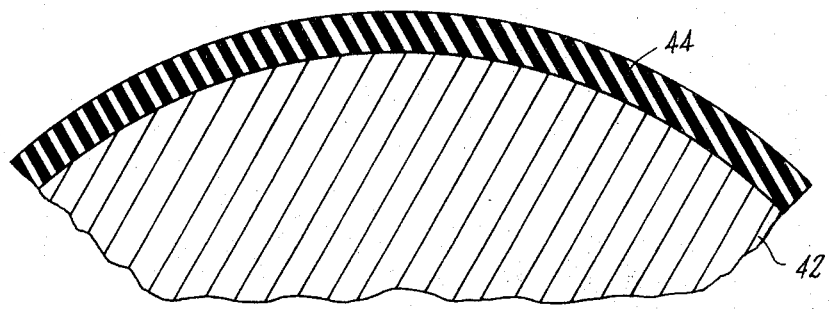
FIG. 7
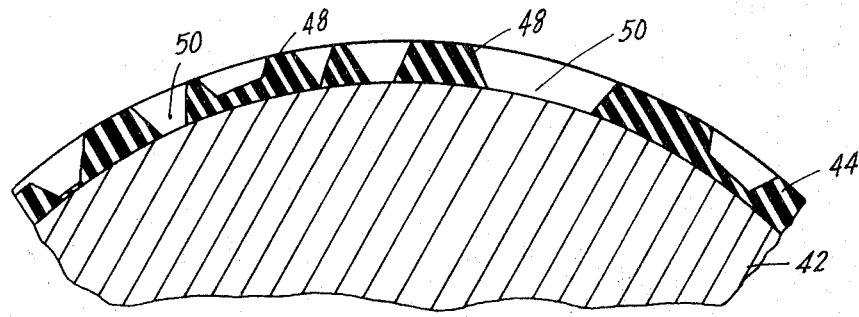
FIG. 9
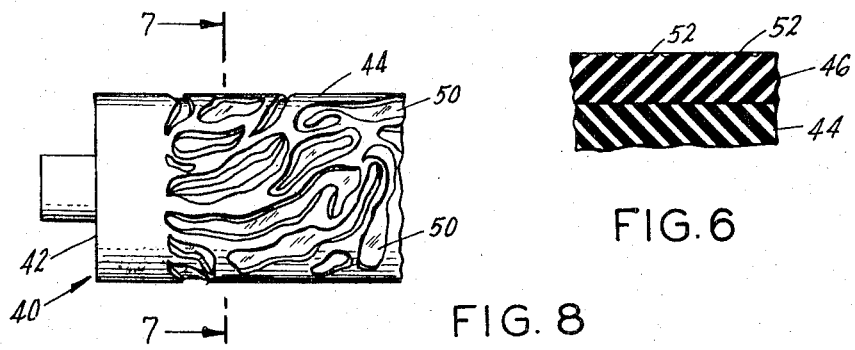
FIG. 8
FIG. 6

United States Patent Office 3,839,514
Patented Oct. 1, 1974

3,839,514
METHOD OF EMBOSSING THERMOPLASTIC SHEET USING A ROLL HAVING A SURFACE OF VARYING HARDNESS
Jan P. Nauta, West Hartford, Conn., assignor to Rowland Development Corporation, Kensington, Conn.
Original application Aug. 20, 1970, Ser. No. 65,433, now Patent No. 3,751,550. Divided and this application May 14, 1973, Ser. No. 360,370
Int. Cl. B29d 11/00; B28b 3/12, 19/00
U.S. Cl. 264—1
13 Claims

ABSTRACT OF THE DISCLOSURE

Method of making and using an embossing roll for producing visual pattern effects on plastic sheet material which roll is formed with a composite coating of synthetic plastic in which the surface layer has areas of greater resilience than other areas and has a multiplicity of closely spaced embossing formations thereon. The surface layer is of non-uniform depth to produce variations in depth of the resilient outer layer and thereby variations in rigidity about the surface of the embossing roll. As a result, distortion in the spacing between embossing formations occurs when sufficient pressure is placed upon the roll at the nip during the embossing operation. The variations in thickness of the inner layer are conveniently accomplished by carving a substantially uniform deposit of the resin on an inner layer into the desired pattern and then depositing the outer layer thereon.

The roll is most desirably employed in the manufacture of optical sheet materials of the type described in William P. Rowland U.S. Pat. 3,357,773 wherein heated sheet material is embossed to provide lens-like formations on one surface and reflective formations on the other surface. The pressure at the roll up produces deflection of the surface coating at the areas of lesser rigidity to produce distortion or spacing between embossing formations.

CROSS REFERENCE TO RELATED APPLICATION

The present application is a division of copending application Ser. No. 65,433 filed Aug. 20, 1970, now Pat. No. 3,751,550.

BACKGROUND OF THE INVENTION

Various techniques have been proposed for the production of synthetic plastic sheet material exhibiting visual pattern effects. In William P. Rowland U.S. Pat. No. 3,357,772, granted Dec. 12, 1967, there are disclosed synthetic plastic materials providing unusual and attractive optical patterns by use of embossments on the front and rear surfaces of the material which phase in and out of axial alignment along at least one axis of the material. The embossments of the front surface are lens-like in configuration and the embossments of the rear surface are reflective in configuration and may assume a lens-like or prismatic form. The phasing in and out of axial alignment of the lens-like and reflective embossments along at least one direction of the surface of the material provides varying optical effects due to variation in the angle of incidence of the light rays focused by the lens-like embossments onto the tapering sidewalls of the reflective embossments which reflect the predominant portion of the light rays impinging thereon. The phasing in and out of axial alignment may be effected by use of patterns of the embossments for the two surfaces which have at least one axis skewed relative to the corresponding axis of the other pattern, or which have a difference in center-to-center spacing between embossments or which have patterns employing different axes for the embossments so as to produce angular variation.

In William P. Rowland U.S. Pat. 3,357,773 there is disclosed and claimed sheet material of the same general character but formed so that the period for the lens-like and reflective embossments to phase in and out of perpendicular axis registry is greater along one pattern axis in at least some areas of the material than the period for phasing in and out of alignment along another pattern axis. As a result, the variations in period produce areas in which the lens-like and reflective embossments are in substantially the same degree of perpendicular axis alignment over a multiplicity of consecutive embossments along the one pattern axis in at least some areas of the material. The variations in period and the extended areas of perpendicular axis alignment produce bands of brightly reflective areas and of poorly reflective areas which form a visual moire pattern. The deviations may be used to provide ribbon-line visual patterns, open node patterns, knothole patterns, etc.

In the embossing of sheet material being extruded or of heated, previously formed thermoplastic sheet material, it is desirable to employ at least one resiliently faced roll in order to facilitate the embossing operation upon both surfaces of the sheet material. As a result, the preferred techniques disclosed in the aforementioned Rowland patents generally employ embossing upon only surface of the sheet material and then lamination of two different lengths of the sheet material to produce the composite structure. Producing embossing formations in the synthetic plastic surface of a roll by engraving or hobbing has been suggested as one technique for producing the desired embossing rolls. Another technique which has been suggested is the embossing of the surface of the roll as the synthetic pastic is setting or curing. Still another technique which has been suggested is the casting of the roll in contact with a female mould having complementary formations.

A highly desirable process based upon the last mentioned technique is disclosed and claimed in Applicant's co-pending application Ser. No. 707,005 filed Feb. 2, 1968 now U.S. Pat. No. 3,619,446 granted Nov. 9, 1971. In the application, there is disclosed a method in which a female mold impression is produced from a male mold member having the desirable peripheral surface configuration intended for the embossing rolls. After the female mold impression has been made by the use of curable synthetic plastic resin, a support member is inserted into the female mold and a synthetic plastic resin is cast on the surface thereof so as to form a male impression upon its peripheral surface conforming to that of the female mold. The synthetic plastic is then cured and the resultant roll is then used as at least one of the pair of rolls operating upon the surface of the heated thermoplastic sheet material so as to emboss its surface characteristics thereupon.

As will be appreciated from the aforementioned Rowland patents, it is necessary for there to be a deviation in perpendicular axis alignment of the lens-like and reflective embossments along at least one axis of the pattern. If that deviation varies in the manner disclosed in the second mentioned patent, a moire-like pattern is obtained. Heretofore, it has been necessary for the cooperating embossing rolls to be configured differently or operated at different speeds to achieve the desired optical pattern effect when both sides of the sheet material have been embossed simultaneously.

It is an object of the present invention to provide a method for embossing sheet material to provide visual pattern effect using rolls having areas of varying rigidity to enable controlled deformation of the embossing rolls at the embossing nip.

It is also an object to provide such a method which is adapted to artistic styling in variaions of optical pattern effect and which is relatively facile and economical.

Yet another object is to provide embossing rolls therefor having a surface with portions of varying rigidity so as to produce controlled deformation thereof.

SUMMARY OF THE INVENTION

It has now been found that the foregoing and related objects can be readily attained in a method in which an embossing roll produces a surface pattern upon synthetic plastic sheet material and is formed by providing a generally cylindrical roll support with a circumferential surface portion having valleys and ridges in the circumferential surface and depositing a continuous surface layer of elastomeric synthetic plastic resin upon the circumferential surface portion to provide a coating of generally cylindrical configuration on the roll support. The elastomeric synthetic plastic resin deposited on the circumferential surface portion is relatively resilient and of lesser hardness than the material from which the circumferential surface portion is formed. A multiplicity of embossing formations is formed in the surface layer which is of greater depth in the valleys of the surface portion than at the ridges of the surface portion, thus producing greater surface resilience in the coating at the valleys than at the ridges.

In the sheet embossing process, the roll of the present invention is assembled with a cooperating embossing roll having embossing formations in the surface thereof to define a nip therebetween, and an extended length of synthetic thermoplastic material at an elevated temperature is passed therebetween to emboss lens-like formations on one surface and reflective formations on the other surface. Sufficient pressure is applied to the rolls at the nip to produce deflection of the composite surface coating at least at the areas of lesser rigidity to produce distortion of the spacing of the embossing formations thereat and thereby of the spacing between embossments being formed in the sheet material thereby.

In the preferred embossing process, both of the embossing rolls have a multiplicity of closely spaced cavities arranged in a pattern over the periphery thereof and extending substantially radially thereinto, and the cavities diminish in cross section inwardly from the periphery in all planes which include the radius along which they extend to provide sidewalls tapering inwardly from the periphery toward the radius thereof. The cavities of one of the rolls are of concave lens-like configuration and the cavities of the other roll may be of the same configuration or of any other configuration to generate embossments which will provide reflection of the light rays focused thereonto by the embossments of lens-like configurations on the other surface. The two rolls thus produce embossments simultaneously on both sides of the length of sheet material and these project on axes perpendicular to both surfaces thereof. As a result, of the cooperating lens-like and reflective embossments on the two surfaces, the variation in spacing between the embossments of the surface produced by the rolls of the present invention will produce variations in the period for the embossments of one surface to phase into and out of perpendicular axis registry with the embossments of the other surface.

For maximum reflectivity and for applications where the embossed sheet material is to be assembled with another material or support, the method desirably includes the step of applying a reflective coating to the reflective embossments. The preferred sheet material is produced by use of a cooperating roll having substantially uniform surface rigidity and driven at substantially the same circumferential speed.

In one embodiment the step of forming the roll support includes forming of a surface portion of synthetic plastic and of generally uniform surface upon a roller and thereafter removing portions of the surface portion to produce the valleys and ridges therein. The forming step for the roll support may include the steps of placing the roller within a cylindrical mold cavity having a greater internal diameter than the roller to provide an annular space therebetween and introducing the synthetic plastic resin into the annular space. The synthetic plastic resin then is subjected to conditions which set the resin into the surface portion of the roll support.

Most preferably the steps of depositing the surface layer and forming the embossments are conducted concurrently by casting the synthetic plastic resin of the surface layer as an annulus in a similar mold having formations on the inner surface thereof to provide the embossing formations in the surface layer. The embossing formations are most desirably cavities of lens-like cross section. The synthetic plastic resins may both be elastomeric, and silicone resins are preferred.

BRIEF DESCRIPTION OF THE DRAWINGS

FIG. 5 is a fragmentary sectional view of an embossing roll having a composite coating formed in accordance with the present invention which does not illustrate the embossing cavities;

FIG. 6 is a similar view to a greatly enlarged scale showing the embossing cavities in the surface portion of the roll;

FIG. 7 is a fragmentary sectional view of roll core having a single uniform layer of synthetic resin deposited thereon;

FIG. 8 is a plan view of the roll of FIG. 7 to a reduced scale after the resin layer has been carved to remove portions thereof;

FIG. 9 is a fragmentary sectional view of the roll shown in FIG. 8 along the line 7—7 thereof and to an enlarged scale;

DESTAILED DESCRIPTION OF THE ILLUSTRATED EMBODIMENT

Figure 1:
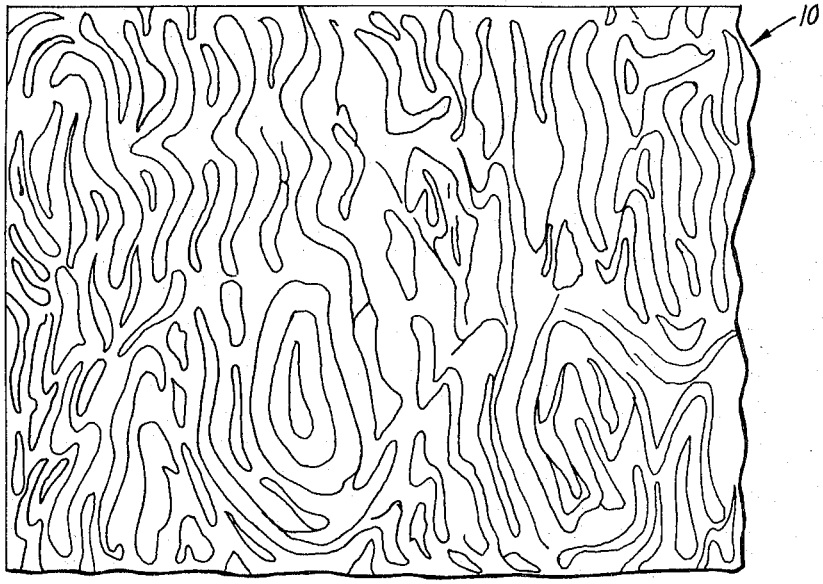
FIG. 1 is a fragmentary plan view of synthetic plastic sheet material produced in accordance with the present invention.
Figure 2:
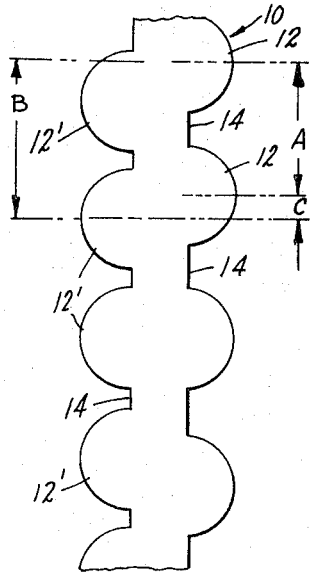
FIG. 2 is a longitudinal sectional view to a greatly enlarged scale at one point along the length of the sheet material of FIG. 1.

Turning first in detail to FIGS. 1 and 2 of the appended drawings, a length of sheet material generally designated by the numeral 10 in FIG. 1 has visual moiré pattern produced by variations in perpendicular axis alignment and in the period for phasing into and out of perpendicular axis alignment of lens-like embossments on the two surfaces of the sheet material. In FIG. 2, which is a greatly magnified cross-section of the sheet material 10 of FIG. 1, it can be seen that the lens-like embossments 12, 12' on the two surfaces of the sheet material 10 are of generally spheroidal configuration and the web portion 14 thereinbetween is somewhat exaggerated for purposes of clarity of illustration. The center-to-center spacing $A$ between the embossments 12 on one side of the sheet material 10 is smaller than the center-to-center spacing $B$ between the embossments 12' on the other surface of the sheet material in at least some areas of the sheet material 10 so that the embossments 12, 12' on the two surfaces will phase into and out of perpendicular axis alignment along at least some of the axes of the pattern of embossments in the sheet material. The misalignment in perpendicular axis registry is indicated by $C$ at one point in FIG. 2. By varying the amount of differential in spacing between embossments on the one surface with respect to the embossments on the other surface, a varying optical pattern is obtained which, when properly configured and diffused, produces the moiré-like appearance of FIG. 1. The details of spacing and the optical principles involved are described fully in U.S. Pat. No. 3,357,773 of W. P. Rowland granted Dec. 12, 1967.

A novel embossing roll embodying the present invention is illustrated in detail in FIGS. 5 and 6 and is generally designated by the numeral 40. The cylindrical steel core 42 has a composite coating thereon comprised of an inner layer 44 of relatively rigid or high durometer synthetic plastic and a continuous outer layer 46 of a relatively resilient or lower durometer synthetic plastic. The outer layer 48 has a multiplicity of closely spaced minute spheroidal cavities 52 (seen in FIG. 6) formed therein which mirror the configuration of the lens-like embossments 12 of the sheet material 10 illustrated in FIGS. 1 and 2.

As can be seen, the inner layer 44 is of non-uniform thickness and configuration so that a series of ridges 48 and valleys 50 of varying height and depth are provided therein about the circumference and along the axial length of the roll 40. As a result, the outer layer 46 of the more resilient synthetic plastic varies in depth to provide a durometer for the composite coating which varies from area to area over the surface of the roll 40. Moreover, it can be seen that the width of the valleys 50 and ridges 48 is varied to provide areas of varying size with a given thickness of the respective layers 44, 46. Generally the side surfaces of the ridges 48 and valleys 50 are inclined so that the width between ridges 48 is greater adjacent the outer surface of the roll 40 than the width of the valley 50 at the base of the ridges 48.

As seen in FIG. 6, the roll 40 has a multiplicity of minute, closely spaced spheroidal cavities 52 formed in the surface layer 46 thereof which are configured and dimensioned to produce the spheroidal embossments 12 when the fluid synthetic resin flows thereinto during the embossing operation. The depth of the cavities 52 and the minimum thickness of the surface layer 46 are cooperatively dimensioned so that the cavities 52 are wholly disposed within the surface layer 46 in the preferred embodiment of the present invention for a purpose to be more fully described hereinafter.

The roll 40 of the present invention is conveniently produced by the method which is diagrammatically illustrated by the stages of roll preparation in FIGS. 7-9 of the drawings. As seen in FIG. 7, relatively high durometer synthetic plastic is deposited on the cylindrical steel core 42 to form a layer 44 of uniform thickness. This is then carved by a knife or other suitable means to produce ridges 48 and valleys 50 of differing widths and depths and of varying configuration as seen in FIGS. 8 and 9. The pattern of the carvings in the layer 44 may be random or it may conform to a pattern indicative of the desired visual pattern effect for the finished sheet product to be embossed thereby. After the carving operation has been completed, the surface layer 46 is applied to provide a composite coating of uniform thickness as seen in FIG. 5. The embossing formations 52 in the surface of the roll 42 may be formed as a part of the operation in which the surface layer 46 is applied or thereafter by a machining or other suitable operation.

Figure 3:
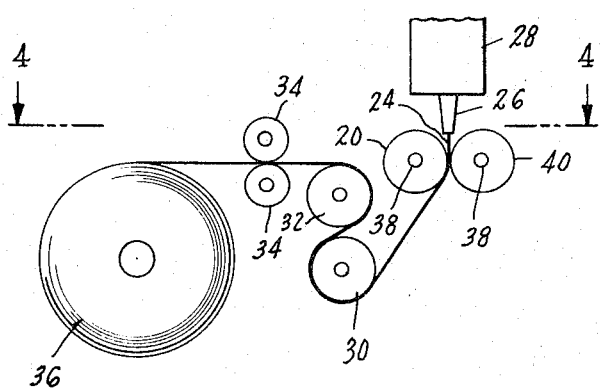
FIG. 3 is a partially diagrammatical fragmentary side elevation view of apparatus used in the process of the present invention.
Figure 4:
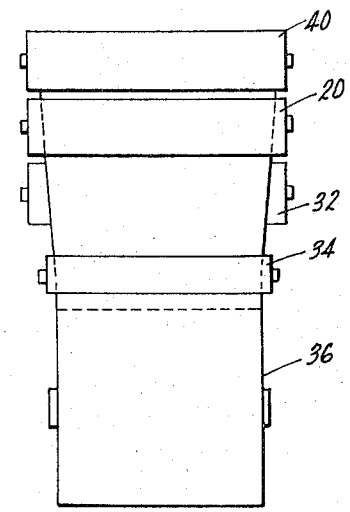
FIG. 4 is a cross-sectional view of the apparatus of FIG. 3 along the line 4—4 thereof.

The roll 40 of the present invention is illustrated as being employed in a combined extrusion and embossing operation in FIGS. 3 and 4 of the drawings. The apparatus includes a steel embossing roll 20 and the differing durometer roll 40 which are mounted on a suitable support (not shown) to define a nip through which the hot sheet material 24 issuing from the die 26 of the extruder 28 must pass. As the plastic material 24 passes through the nip, it is caused to flow into the very small cavities 52 formed in the surfaces of the embossing rolls 20, 40 to form the embossments 12, 12' on both surfaces thereof. The sheet material 24 desirably passes about the periphery of the steel embossing roll 20 and is cooled thereby as well as by the metal-core resilient surfaced embossing roll 40 to a lesser extent and by the air after it has flowed to form the embossments 12, 12'. Generally, both of the rolls 20, 40 are cooled by a chilled fluid passed through cavities therein (not shown) by means of suitable conduits (not shown) extending through the shafts 38 upon which they are mounted. The steel roll 20 desirably is driven by a variable speed motor (not shown); the resilient surfaced roll 22 is also driven by suitable drive means (not shown).

The sheet material 24 passes about the periphery of the steel idler roll 30 and then over the rubber surfaced roll 32 so that the desired degree of tension can be maintained in the sheet material 24. These rolls 30, 32 are desirably driven at a constant lineal speed equal to that of the roll 40 by suitable means (not shown) so as to maintain a constant lineal speed of take off from the nip. Finally, the sheet material passes between the take off rolls 34 and is coiled upon the winding roll 38 although it may pass through other equipment such as trimmers, sheeters, etc.

The effect of the varying composite durometer of the surface of the embossing rolls of the present invention is partially diagrammatically illustrated in FIGS. 10-13 of the drawings. As seen in FIGS. 3 and 4, the synthetic plastic material 24 passes into the nip between the roll 40 of the present invention and a steel embossing roll 20. If the roll 40 had a surface coating of uniform and high durometer, the pressure at the point of tangential contact would produce a uniform amount of distortion (if any) in the cylindrical configuration of the coating at the nip and this would tend to produce a uniform distortion (if any) in the spacing between centers of the embossments 12 being formed thereby.

Figure 10:
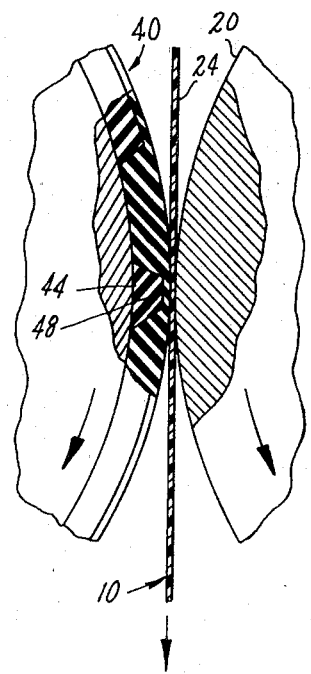
FIG. 10 is a fragmentary view in partial section of two rolls and a length of synthetic plastic being embossed to diagrammatically illustrate the process of the present invention.
Figure 12:
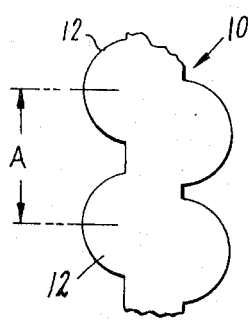
FIG. 12 is a longitudinal sectional view to a greatly enlarged and exaggerated scale of the sheet material produced by the rolls at the position shown in FIG. 10.

Turning first in detail to FIGS. 10 and 12, the steel roll 20 is shown in registry with a portion of the roll 40 at which the thickness of the layer 46 is relatively minor so that the composite durometer is relatively high. As a result the compression or distortion of the surface from truly cylindrical is relatively minor as indicated by FIG. 10. As seen in FIG. 12, the resultant portion of the sheet material 10 produced thereby has the embossments 12 space apart a center-to-center distance of $A$.

Figure 11:
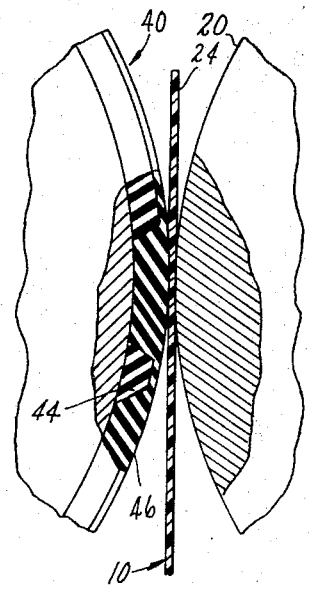
FIG. 11 is a similar view with the rolls rotated from the position of FIG. 10.
Figure 13:
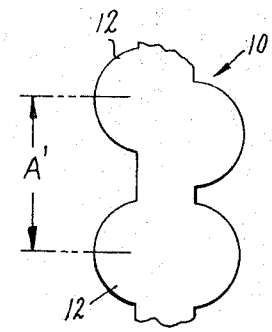
FIG. 13 is a similar view of the sheet material produced by the rolls at the position shown in FIG. 11.

Turning now to FIGS. 11 and 13, the rolls 20, 40 have turned so that the steel roll 20 is now in registry with a portion of the roll 40 at which the thickness of the surface layer 46 is relatively large so that the composite durometer of the coating at this point is relatively low. The pressure at the nip produces substantial flattening or distortion of the surface of the layer 46. As the softer durometer portion moves into the nip, this is believed to produce an elongation of the spacing between cavities 52 and thereby the center-to-center spacing $A'$ of the embossments 12 in the portion of the sheet material 10 formed thereby as seen in FIG. 13. A comparison of the center-to-center spacings $A$ and $A'$ will indicate the elongation which is thus effected. As the rolls 20, 40 continue to rotate, the elongation in center-to-center spacing $A$ diminishes as the ridge portion 48 is approached.

Various types of elastomeric synthetic resins may be utilized to obtain the desired variation in durometer in the surface coating upon the rolls including silicone rubbers, polyurethanes and synthetic rubbers such as polybutadienes and interpolymers of butadiene with other ethylenically unsaturated monomers such as styrene, acrylonitrile; acrylates and methacrylates; polyisoprenes; ethylene/propylene terpolymers; etc. Generally, the resins used for the inner relatively hard layer should have a durometer of 80–120 on the "Shore A" scale, and the relatively resilient outer layer should have a durometer of 40–80 units on the same scale. The variation in durometer between the two layers should be at least 10 units and preferably should be 20-40 units. In practice, a silicone resin having a durometer of about 92 has been used effectively in combination with a silicone resin having a durometer of about 65 to provide the composite coating. The resins which have proven to be particularly advantageous from the standpoint of durability, desired durometer, facility of molding and temperature resistance are the silicones. Exemplary of silicone compositions which have been employed are those manufactured by Dow-Corning and specifically that sold under the Trademark SYLGARD 182 and those manufactured by General Electric Company and specifically those sold under the designations RTV 615 and RTV 630. The particular polymer and even the characteristics of a given polymer will vary with the desired application and durometer.

The thickness of the composite resin coating comprising two layers may be varied although a total thickness of from $\frac{1}{16}$ to one inch is desirable. The outer, relatively resilient layer should be at least $\frac{1}{64}$ inch in thickness to accomodate the depth of the embossments and to provide a well-bonded surface layer on the tops of the ridges. However a thickness of more than $\frac{1}{8}$ inch above the ridges will tend to produce excessive resilience in the composite coating and obscure the effect of the more rigid inner layer. Preferably the thickness of the more resilient outer layer should be $\frac{1}{32}$–$\frac{1}{16}$ inch. Normally the thickness of the inner layer will be the difference between the thickness of the entire coating and the thickness of the outer layer. However, in some areas of the roll, the entire inner layers may be removed to produce the desired durometer characteristic and, accordingly, the thickness of the entire coating will equal the thickness of the outer layer in that area.

The layers of the coatings may be formed by spraying, dipping, roll coating or other means. However, it is preferred to form the inner layer by providing a mold around a male roller core. The mold is cylindrical in interior configuration with a diameter larger than that of the core. A fluid resin is introduced into the space between the roller core and the wall of the mold, and the resin is subjected to temperature changes sufficient to cure and set the resin, after which the coated roll is removed. If so desired, the female mold may have a surface configuration to provide the ridges and valleys as the coating is cured and set.

Portions of the layer so produced are removed selectively from the first coating to form the desired pattern of cutouts, i.e., ridges and valleys. The pattern produced does not have to be an abstract one as illustrated in FIG. 1, and can instead be a name or other representation. A pattern of paper or the like can be placed over the surface of the coated roll to facilitate the carving operation.

A second elastomeric layer is then deposited upon the carved first layer by any convenient technique, and the pattern of formations to produce the embossments is developed therein by casting, reverse embossing or machining. Preferably, the outer layer is formed by providing a female mold around the carved first coating and the core, and this mold has a cylindrical interior surface with a multiplicity of formations thereabout for producing a complementary embossed surface. The maximum diameter of the first layer on the roller core is of lesser diameter than the interior of the mold so as to provide an annular space therebetween. A fluid resin is introduced into the space between the walls and subjected to temperature conditions which causes it to set and produce a relatively durable and closely conforming generally cylindrical continuous surface having the desired embossing formations therein.

Although the embossing formations in the outer surface of the roll may vary in configuration, nevertheless they should be capable of producing a visual pattern in combination with embossments produced on the other surface of the sheet materials by a cooperating embossing roll. Preferably such embossing formations will be configurated so as to provide lens-like formations which are either convex or concave with respect to the surface of the sheet material in which they are formed. Most desirably, such lens-like formations are convex with respect to the surface of the sheet material and accordingly, the embossing formations in the surface are concave in character in the manner illustrated in FIG. 6. The details of pattern and dimensions for the embossing formations may be readily derived and understood by reference to Rowland U.S. Pats. Nos. 3,357,773 and 3,357,772. In these patents, the optical principles in the production of the visual patterns are described in detail.

In accordance with the preferred embodiment of an embossing method employing the rolls of the present invention, the differential durometer roll is used in combination with another embossing roll having embossing formations. The two rolls emboss the two surfaces of the synthetic plastic sheet material passing therebetween to produce a multiplicity of closely spaced, substantially identical curvilinear lens-like formations arranged in a first pattern on the front surface thereof and a multiplicity of closely spaced, substantially identical reflective formations arranged in a second pattern on the rear surface. The two patterns of formations extend in axes perpendicular to the front and rear surfaces and the formations of the rear surface diminish in horizontal cross-section along the vertical and horizontal axes of the sheet material, i.e., they diminish in cross section outwardly from the body portion to provide side walls tapering inwardly from the body portion toward the vertical axes. The lens-like formations are curvilinear along both horizontal and vertical axes of the sheet material, and the reflective formations phase in and out of axial registry with the lens-like formations along at least one horizontal axis of the sheet material to provide varying optical effects due to variation in the angle of incidence of light rays focused by the lens-like formations of the front surface onto the tapering side walls of the reflective formations. Each of the patterns has a plurality of axes along which the formations are arranged and the lens-like and reflective formations are in substantially the same degree of axial alignment over a multiplicity of formations along one axis of one pattern in some areas of the sheet material and the period for the formations to phase into and out of axial registry is greater along this axis in at least some areas of the sheet material than the period for such phasing along another axis of the sheet material. In this manner, the variations in period and extended areas of alignment produce bands of brightly reflective areas and poorly reflective areas which form a visual moiré pattern.

As pointed out in the aforementioned Rowland patent, generally the lens-like formations of the embossed sheet material are most desirably embossments of a configuration which will focus substantially the light rays entering thereinto from various directions, and, accordingly, have a curvilinear convex periphery and horizontal cross-section. Although parabolic configurations are the more highly efficient focusing elements, major segments of spheres, preferably approximately hemispheres, have also proven highly effective. Since some distortion of the spherical configuration may occur and be tolerated in the present invention, the term "spheroidal" is used herein to encompass both spherical configurations and those configurations deviating somewhat therefrom. Although the embossment on the rear or other surface may be prismatic or conical in configuration, it is far more preferable to employ convex lens-like embossments to obtain considerably greater optical activity and greater reflection as well as retroreflection. When lens-like embossments are employed on the rear surface and a reflective coating is applied thereto, the convex side walls of the rear embossments may taper more gradually to obtain greatest reflection from the center of the lens-like embossments in forming the mirrors.

For most applications to avoid unduly large nodes, the embossments must be of relatively small width and closely spaced so as to obtain the repetitive phasing in and out of axial registry within relatively short distances. Generally, the embossments must be less than about 0.040 inch in width to achieve the desired effect and preferably less than about 0.025 inch, and the spacing and size of the bossments of both pattenrs should be substantially the same, except as distorted to produce the visual pattern.

Although a two axis pattern may be employed for laying out the embossments, the preferred pattern employs a hexagonal array to maintain close spacing and to minimize flats between embossments as well as to enhance the optical effects.

The thickness of the sheet material is largely dependent upon the focal length of the lens-like embossments of the front surface (and of the rear surface when lens-like embossments are employed thereon). For purely decorative effect, the total thickness of the sheet material may vary from about one-half to two and one-half times the focal length of the lens-like embossments on the front surface. For achieving a high degree of retroreflectivity with lens-like reflective embossments, a highly reflective coloring agent (or agents) desirably is applied to the major portion of the rear surface, and the thickness of the sheet should be substantially equal to the focal length of the lens-like embossments on the front surface causing the light rays to focus at about the centers of the reflective embossments or at a distance equal to the sum of the focal lengths of the lens-like embossments on the front surface and the lens-like "mirrors" on the rear surface, the former being optimum for maximum retroreflectivity. However, a measure of variation and deviation is tolerable in the present invention since constant axial phasing over the axes of the sheet will result in refracted light rays striking and focusing at various points along the convexly curved surfaces of the rear lens-like projections of each period or phase so as to achieve a significant amount of retroreflection from one or more combinations of embossments in various degrees of axial registration in a single phase or period of the pattern.

Various synthetic plastics may be used for the sheet material of the present invention, including acrylic acid etsers such as methyl methacrylate, cellulose acetate, cellulose acetate-butyrate, cellulose propionate, vinyl chloride and copolymers thereof, polystyrene, polycarbonates, cellulose nitrate, polypropylene and polyethylene. Laminates may be desirable to provide more highly weather and abrasion-resistant surfaces such as by use of very thin surface films of polyethylene terephthalate.

Providing a reflective coating on the reflective formations instead of relying entirely upon the critical angle for reflection renders the sheet material more highly reflective and even more optically interesting due to accentuation of highlights and due to accentuation of reflection of incident light rays. The phasing in and out of axial alignment of the lens and reflector formations within each node or phase of the pattern along at least one axis of the patterns produces a multiplicity of areas of dazzling brightness due to reflection of the light in bundles of parallel rays and also effectively ensures a number of lens and reflector combinations to retroreflect light rays over a wide angle of incidence.

When a vacuum metallized or chemically deposited metallic coating is applied to the rear surface, it is highly desirable that it be protected by an outer coating or lacquer, plastic film or other suitable material. For some applications, it may be desirable to overlay the rear surface of the reflectively coated sheet material with a layer of synthetic plastic or other material to provide a flat-surfaced layer which does not interfere with the reflective action of the reflective embossments.

As has been indicated hereinbefore, the visual pattern is dependent upon producing variation in the center-to-center spacing of the embossments on one surface of the sheet material. The rolls of the present invention may be used in combination with a cooperating roll having a different pattern for the embossing formations or a different center-to-center spacing for the embossing formations. The cooperating roll may have the same pattern and spacing for the embossing formations but may be driven at a circumferential speed which is different from that of the present invention, and this differential in speed may be uniform over the entire period of operation or it may be varied to superimpose still further effects. In still another procedure, two rolls of the type produced by the present invention may be used for embossing the opposite surfaces of the sheet material. In order to obtain the most control and consistent reproduction of the pattern contemplated in the development of the rolls of the present invention, such rolls will preferably be used in combination with a cooperating roll having the same or similar pattern of embossing formulations and driven at a uniform speed. Most desirably, the cooperating roll will have a relatively high, uniform durometer coating and will be driven at substantially the same circumferential speed.

Although the embossing process has been illustrated as being used in combination with an extrusion operation, it will be appreciated that the embossing process may also be used in conjunction with synthetic thermoplastic material which has been previously formed and which is heated to a thermoplastic condition. For example, the process has been advantageously utilized with calendared polyvinyl chloride film which is preheated immediately prior to passage into the nip between the embossing rolls.

Thus, it can be seen that the method of the present invention utilizes embossing rolls having a surface coating of varying rigidity or durometer so that distortion in the spacing between embossments on the sheet material produced thereby may be readily and controllably effected. The embossing rolls preferably have lens-like cavities formed therein to produce lens-like embossments which cooperate with reflective embossments formed on the other surface of the sheet material, thus insuring interesting visual optical pattern effects as the result of focusing and reflection of light rays impinging upon the sheet material. The distortion in the spacing of the embossments occurring at the areas of lesser rigidity provides variation in the period for phasing of the embossments of the two surfaces into and out of perpendicular axis registry. The method adapts itself to artistic styling of the areas of varying resilience so as to produce unique and highly interesting optical effects. Moreover, the method is relatively simple and relatively economical as compared with techniques requiring the engraving or hobbing of the embossing rolls in the desired pattern.

Having thus described the invention, I claim:

1. In a method for making synthetic plastic sheet material providing a visual pattern, the steps comprising:
    (a) forming an embossing roll having a surface coating of elastomeric resin upon a circumferential inner portion having valleys and ridges therein, said elastomeric resin of said surface coating being relatively resilient and of lesser hardness than the material of the circumferential inner portion, said surface coating being of greater depth in the valleys of said inner portion than at the ridges of said inner portion, the surface resilience of said surface coating being greater at said valleys than at said ridges, said coating having a multiplicity of embossing formations in the surface thereof;
    (b) passing an extended length of synthetic thermoplastic material at an elevated temperature into the nip between said first-mentioned embossing roll and a second embossing roll having embossing formations in the surface thereof to emboss lens-like formations on one surface of said sheet material and reflective formations on the other surface thereof; and
    (c) applying sufficient pressure to said rolls at said nip to produce deflection of said surface coating at least at said areas of lesser rigidity to produce distortion of the spacing between said embossing formations thereat and thereby variation in the spacing between embossments being formed in the sheet material thereby.

2. The method in accordance with Claim 1 wherein said second-mentioned embossing roll has a metallic circumferential surface.

3. The method in accordance with Claim 1 wherein said second-mentioned embossing roll has a surface of synthetic plastic resin and is of uniform hardness.

4. The method in accordance with Claim 1 wherein said cooperating roll has substantially uniform surface rigidity.

5. The method in accordance with Claim 1 wherein said cooperating roll is also a roll having varying surface rigidity.

6. The method in accordance with Claim 1 wherein one of said rolls is driven at a circumferential speed differing from that of the other.

7. The method in accordance with Claim 1 wherein both of said rolls have a multiplicity of closely spaced cavities arranged in a pattern over the periphery thereof and extending substantially radially thereinto, said cavities diminishing in cross section inwardly from the periphery of the rolls in all planes which include the radius along which they extend to provide sidewalls tapering inwardly from the periphery toward said radius, the cavities of one of said rolls being of concave lens-like configuration, said rolls simultaneously producing embossments on both sides of said length of synthetic plastic material projecting on axes perpendicular to both surfaces thereof.

8. The method in accordance with Claim 7 wherein said cavities of both of said rolls are of concave lens-like configuration.

9. The method in accordance with Claim 8 in which said cooperating roll has substantially uniform surface rigidity, has embossing formations substantially the same as those of said first mentioned-roll and is driven at a circumferential speed substantially equal to that of said first-mentioned roll.

10. The method in accordance with Claim 1 wherein said step of forming the embossing rolls includes the steps comprising:

(a) forming a generally cylindrical roll support with a circumferential surface portion having valleys and ridges in the surface thereof;

(b) depositing a surface layer of elastomeric synthetic plastic resin upon said surface portion of said roll support to provide a coating of generally cylindrical configuration on said roll support, said elastomeric synthetic plastic resin of said surface layer being relatively resilient and of lesser durometer than the resin of said circumferential surface portion; and (c) forming a multiplicity of embossing formations in said surface layer.

11. The method in accordance with Claim 10 wherein said step of forming said roll support includes the forming of a surface portion of said synthetic plastic resin and of generally uniform surface upon a roller and thereafter removing portions of said surface portion to produce said valleys and ridges.

12. The method in accordance with Claim 10 wherein said depositing and forming steps include placing the roller within a cylindrical mold cavity having a greater internal diameter to provide an annular space therebetween, introducing said synthetic plastic resin into said annular space and subjecting said synthetic plastic resin to conditions to set said reisn into said surface portion.

13. The method in accordance with Claim 11 wherein said steps of depositing said surface layer and forming said embossments are conducted concurrently by casting said elastomeric synthetic plastic resin of said surface layer as an annulus in a female mold having formations on the interior surface thereof to provide said embossments in the surface layer.

References Cited
UNITED STATES PATENTS

| | | | |
|---|---|---|---|
| 2,351,034 | 6/1944 | Gabor | 350—167 |
| 3,636,147 | 1/1972 | Rowland | 264—1 |

ROBERT F. WHITE, Primary Examiner

W. E. HOAG, Assistant Examiner

U.S. Cl. X.R.

29—148.4 D; 264—139, 154, 284, 293; 425—385, 403